May 14, 1963  P. S. VOSBIKIAN ETAL  3,089,240
SHEARS
Filed July 6, 1961  2 Sheets-Sheet 2
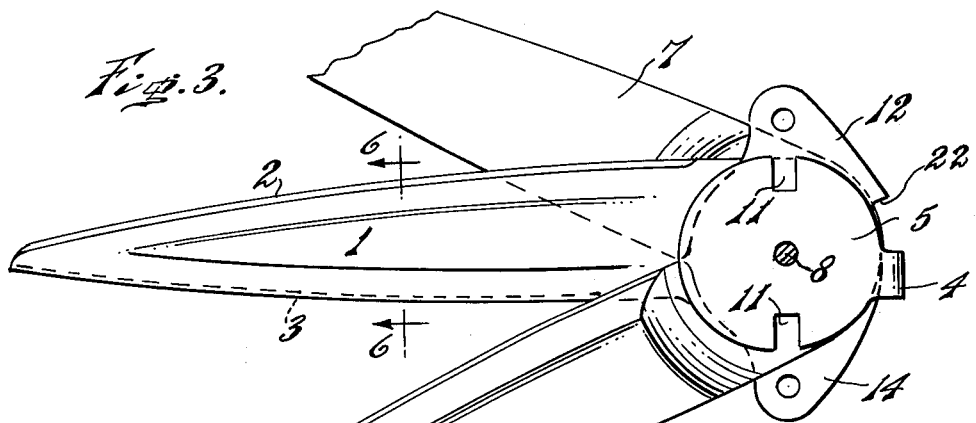
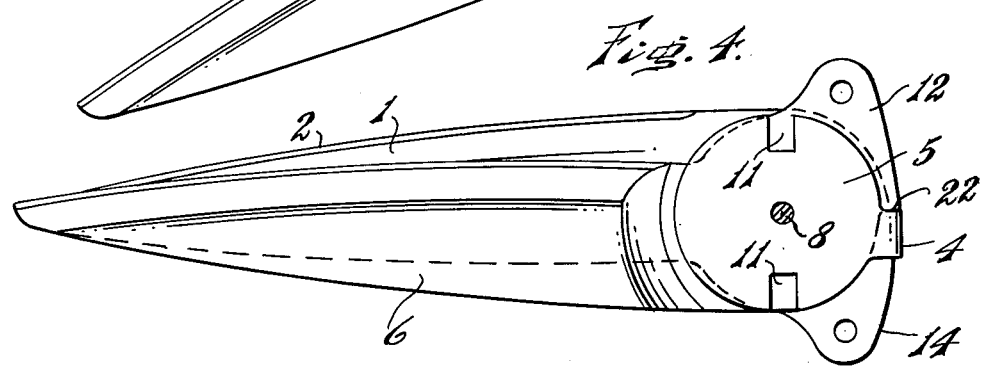
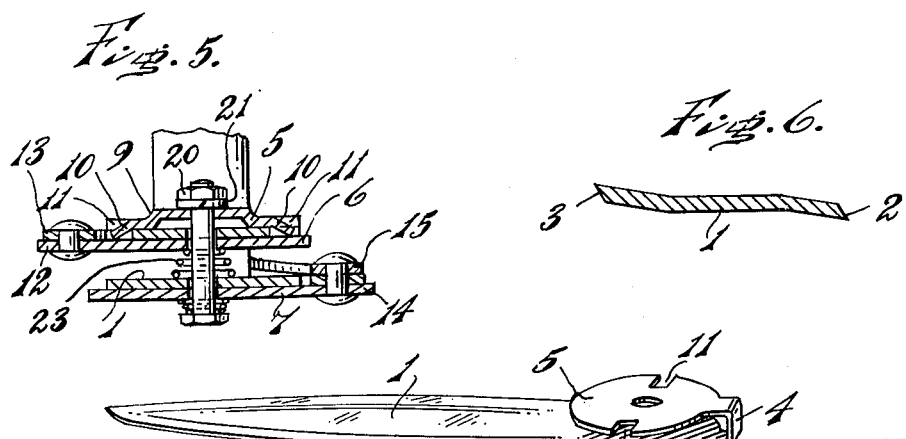
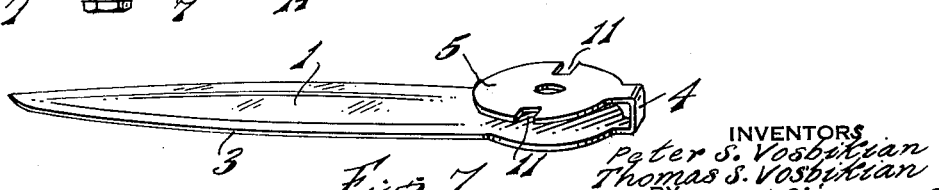
INVENTORS
Peter S. Vosbikian
Thomas S. Vosbikian
BY Herbert S. Fairbanks
ATTORNEY

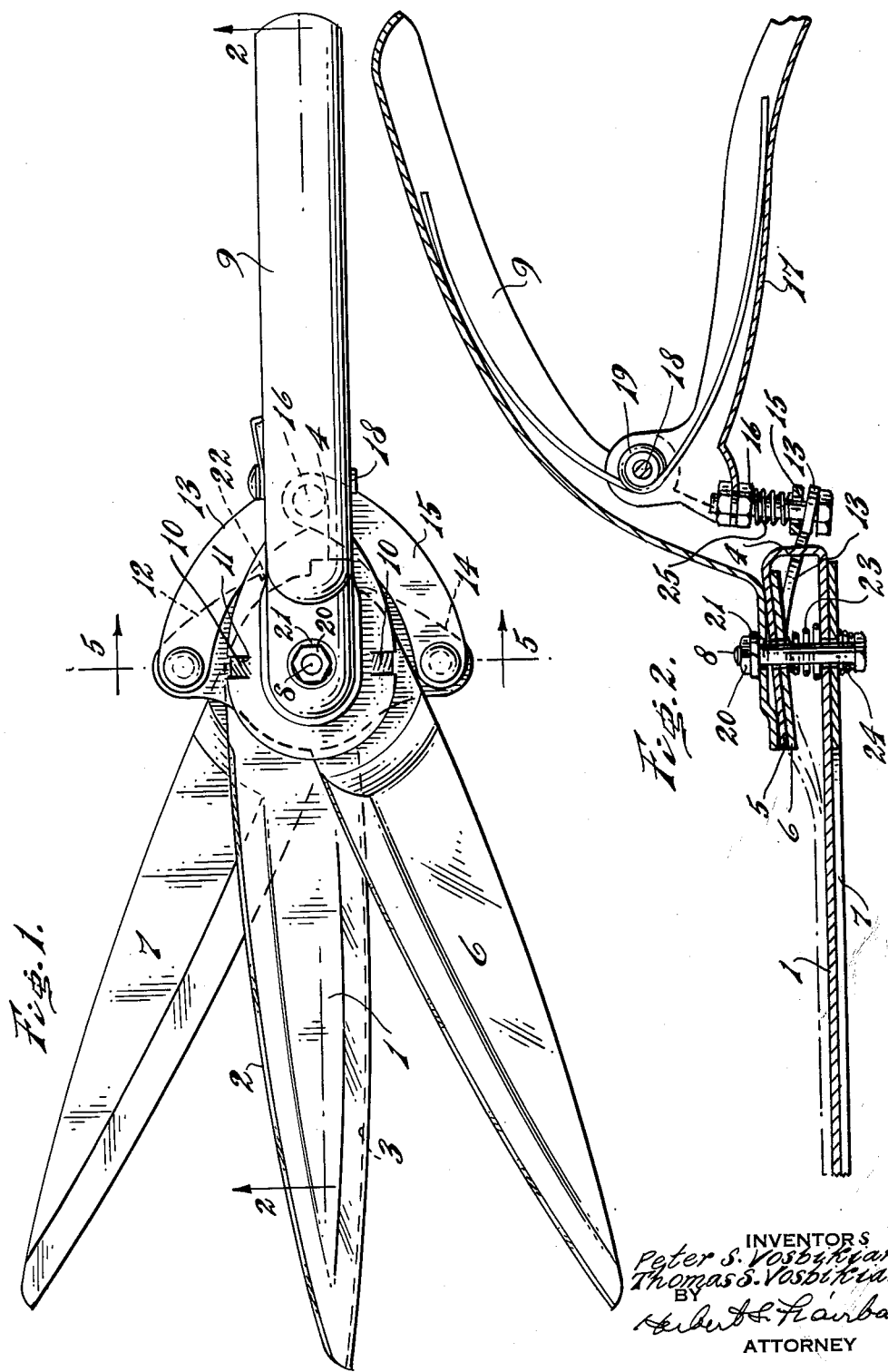

3,089,240
SHEARS
Peter S. Vosbikian, Melrose, and Thomas S. Vosbikian, Philadelphia, Pa. (both of 20th and Oxford Sts., Philadelphia, Pa.)
Filed July 6, 1961, Ser. No. 122,211
2 Claims. (Cl. 30—213)

The standard practice in the manufacture of shears is to provide two pivoted blades with cooperating cutting edges.

In our present invention, we provide a centrally fixed blade with cutting edges at opposite sides and side blades pivotally connected with the fixed blade and movable transversely thereover. The cutting edge at one side of the fixed blade is preferably at the top and the cutting edge at the opposite side at the bottom of the blade. Tension means are provided to maintain a balanced construction and smooth cutting operation.

The object, therefore, of the invention is to devise novel shears with a fixed blade having cutting edges at opposite sides with cooperating side, single movable blades so that two cuts are made in one operation of the shears.

A further object of the invention is to devise a novel construction and arrangement of the cooperating component parts.

With the foregoing and other objects in view as will hereinafter clearly appear, our invention comprehends novel shears.

For the purpose of illustrating the invention, we have shown in the accompanying drawings a preferred embodiment of it which we have found in practice to give satisfactory and reliable results. It is, however, to be understood that the various instrumentalities of which the invention consists can be variously arranged and organized, and we, therefore, do not desire to be limited, except by the scope of the appended claims, to the exact arrangement and organization of these instrumentalities as herein set forth.

FIGURE 1 is a top plan view of shears embodying our invention.

FIGURE 2 is a section on line 2—2 of FIGURE 1.

FIGURE 3 is a plan view of the blades in open position and with one blade broken away.

FIGURE 4 is a plan view of the blades in closed condition.

FIGURE 5 is a section on line 5—5 of FIGURE 1.

FIGURE 6 is a section on line 6—6 of FIGURE 3.

FIGURE 7 is a perspective view of the stationary blade.

Similar numerals of reference indicate corresponding parts.

Referring to the drawings:

A central, stationary blade 1 has at opposite sides cutting edges 2 and 3, one being at the top of the blade and the other at the bottom of the blade. The blade 1 is bent upwardly at its rear end at 4 and terminates in a forward extension 5 spaced from the body portion of the blade.

A top, movable blade 6 and a bottom, movable blade 7 have cutting edges cooperating with the cutting edges of the stationary blade 1. The rear end portions of the blades have disc like bearing portions through which a pivot 8 passes.

An upper handle 9 has a flattened portion which seats on the extension 5 and has lugs 10 which extend into openings 11 in the extension 5 to maintain proper alignment of the upper handle with the stationary blade.

The movable blade 6 has an offset arm 12 to which one end of a curved link 13 is pivoted, and, in a similar manner, the blade 7 has an offset arm 14 to which one end of a curved link 15 is pivoted. The rear ends of the links are apertured to receive a headed bolt 16 fixed to a lower handle 17 pivoted at 18 to the upper handle 9, and having spring 19.

The pivot 8 passes through the upper handle and a nut 20 and lock washer 21 secured the upper handle in position.

The extent of the closing movement of the movable blades is limited by a shoulder 22 on top blade 6 contacting the part 4 of the fixed blade. The rear end portion of the top blade is deflected to ride on the bottom face of the extension 5, and a spring 23 is between the body portion of the stationary blade and the top blade.

The bottom blade is tensioned against the stationary blade by a spring 24 on the pivot 8 between the head of the pivot and the bottom blade.

A spring 25 is also preferably provided on the bolt 16 between its head and the lower handle.

The shears are primarily designed for use as grass shears, but may be used to cut any desired material.

When the handles are pressed together two cuts will be made.

The novel manner in which the blades and handles are tensioned provide for a smooth cutting action.

Having thus described our invention, what we claim as new and desire to secure by Letters Patent is:

1. Shears, comprising a stationary central blade having cutting edges at opposite sides, having its rear end extending upwardly and forwardly and forming an upper forward extension, a lower moveable blade, having an offset arm and located below said stationary blade, an upper moveable blade above said stationary blade, having its rear end deflected upwardly and rearwardly and having an offset arm and positioned between the forward extension and the body portion of the stationary blade, an upper handle on said forward extension, a pivot pin extending through said blades, the forward extension of the stationary blade and through said handle, a lower handle pivoted to the upper handle, links connecting said arms with the lower handle, and tension means for said blades to maintain their cutting edges in contact.

2. The construction defined in claim 1, wherein the upper and lower blades are provided with means to contact the rear portion of the stationary blade to limit the extent of the closing movement of the upper and lower blades.

References Cited in the file of this patent
UNITED STATES PATENTS

| | | |
|---|---|---|
| 1,287,754 | Robertson | Dec. 17, 1918 |
| 1,931,045 | Vosbikian et al. | Oct. 17, 1933 |
| 2,944,340 | Vosbikian | July 12, 1960 |